United States Patent [19]

Haferkamp et al.

[11] 4,175,001

[45] Nov. 20, 1979

[54] GAS TURBINE POWER PLANT WITH CLOSED GAS CIRCUIT

[75] Inventors: Dirk Haferkamp; Alija Hodzic; Karl-Uwe Schneider, all of Mannheim, Fed. Rep. of Germany

[73] Assignee: Hochtemperatur-Reaktorbau GmbH, Mannheim, Fed. Rep. of Germany

[21] Appl. No.: 829,204

[22] Filed: Aug. 30, 1977

[30] Foreign Application Priority Data

Sep. 4, 1976 [DE] Fed. Rep. of Germany ....... 2639877

[51] Int. Cl.² .............................................. G21C 19/28
[52] U.S. Cl. ....................................................... 176/60
[58] Field of Search .................................... 176/58–60, 176/65

[56] References Cited

U.S. PATENT DOCUMENTS

| | | | |
|---|---|---|---|
| 3,210,254 | 10/1965 | Fortescue | 176/59 |
| 3,249,507 | 5/1966 | Gondoin et al. | 176/59 |
| 3,424,239 | 1/1969 | Coudray | 176/58 |
| 3,470,066 | 9/1969 | Livsey et al. | 176/60 |
| 3,816,246 | 6/1974 | Kumpf | 176/59 |
| 3,883,392 | 5/1975 | Burylo et al. | 176/60 |
| 4,025,387 | 5/1977 | Haferkamp et al. | 176/60 |
| 4,045,285 | 8/1977 | Baumgaertner et al. | 176/60 |

Primary Examiner—Verlin R. Pendegrass
Assistant Examiner—S. A. Cangialosi
Attorney, Agent, or Firm—Robert J. Koch

[57] ABSTRACT

Disclosed is a power plant having a nuclear reactor as a heat source and turbine assemblies comprising turbine, compressor and heat exchanger elements. The nuclear reactor is encased within a thermal barrier which is encased within a liner so as to form a free space between the thermal barrier and the liner. The free space is in communication with a cooling gas source, and the interior of the thermal barrier is in communication with a gas source.

Also disclosed is a method of cooling a nuclear reactor plant by passing a cooling gas into the free space between the liner and the barrier which is then passed to a recuperator after which it is passed within the thermal barrier surrounding the reactor.

22 Claims, 4 Drawing Figures

GAS TURBINE POWER PLANT WITH CLOSED GAS CIRCUIT

BACKGROUND OF THE INVENTION

1. Field of the Invention

The invention relates to a gas turbine power plant having a closed gas circuit in which a nuclear reactor acts as a heat source. At least one gas turbine assembly is provided including compressors, and heat exchangers. The devices comprising the same plant are arranged within a reactor pressure vessel, whereby the nuclear reactor, surrounded by a thermal barrier, is installed within a reactor cavity, coated by a liner and a gas circulation circuit for the power plant working gas and cooling gas communicating with the component parts of the plant.

Such a plant has the advantage that only the produced mechanical or electrical power and cooling water, which has not come into contact with the contaminated gas, need be led out of the reactor pressure vessel. The area outside of the reactor pressure vessel or tank is thus virtually protected from the contaminated gas and the internal volume is optimally utilized. Special connecting elements between the single plant parts carrying active gas are avoided by using integrated construction, which very favorably improves the construction and the operation of high temperature reactors. Such a turbine power plant has, for example, been described in German Offenlegungsschriften Nos. 24 04 843 and 24 54 451, and in respectively corresponding U.S. Pat. Nos. 3,998,057 and 4,025,387, the disclosures of which are herein incorporated by reference.

2. Description of the Prior Art

It is also known to provide the reactor pressure vessel of such plants with a steel plate liner to effect the sealing. The sealing liner is equipped on its inner surface with thermal insulation to protect the concrete or cast metal wall of the reactor pressure vessel from the high temperatures of the gases. At the same time, a cooling system is arranged on the outside of the sealing liner (on the side of the pressure vessel wall) through which water flows to protect the liner from too high a thermal load. With this arrangement, the insulating layer lying inside is penetrated by the coolant, while the sealing liner remains cold (cold liner). This construction type has the disadvantage that the original sealing liner is covered by thermal insulation lying inside, and thus the sealing liner is not accessible to inspection. In order to overcome this disadvantage, solutions have been proposed in which the sealing liner is directly exposed to the hot reactor cooling medium, and the thermal insulation is arranged between the liner and the wall of the reactor pressure vessel.

German Offenlegungsschrift No. 22 36 026 describes a "hot liner" which is manufactured of high heat-resistant material and, whereby its thermal insulation layer, located between the liner and the prestressed concrete casing, is tightly adjacent to concrete casing. A cooling system is provided in the area of the thermal insulation layer which decreases the temperature to an acceptable level with respect to the prestressed concrete.

German Offenlegungsschrift No. 23 58 142 discloses a further thermal insulating system having a "hot liner" in which, in addition to a first uncooled liner forming a tight metal skin, there is provided a second liner which serves as a casing for the prestressed concrete and has cooling tubes along its outside. Thermal insulation is arranged between both liners.

Further, German Offenlegungsschrift No. 23 42 262 illustrates a cooling system for the prestressed concrete vessel of a gas cooled nuclear reactor made up of at least two protective liner coverings, lying inside one another, with tubes welded to the latter, through which the coolant flows. The tubes of the single liner protective coverings are connected in series from the outside to the inside in the path of flow of the cooling medium, and the space between the protective liner coverings is filled with thermal insulation material. Streams of the reactor coolant, cooled down to temperatures as low as possible, are added again to the main gas stream after being heated, due to energy losses, before the entry into the reactor core. The cooling streams are fed into the external liner at a temperature of 0° C. The cooling necessary to reduce the temperature to this extent is produced in absorption plants (by means of waste heat of the total process). An auxiliary blower may be used to convey the coolant flowing through the liner at an increased pressure at the reactor entry over that of the main gas stream. This cooling system has the advantage that no cooling water can enter the reactor cavity in the event of a leakage of the liner tubes (as a result of an earthquake or other major disaster). Furthermore, the heat in the liner tubes, due to energy losses, is regained. Of course, additional construction elements, such as absorption plants and auxiliary blowers are necessary to devices of this nature.

Finally, German Auslegeschrift No. 18 06 471 discloses an apparatus for cooling, by means of water, a cylindrical casing existing in a prestressed concrete vessel, which has a gas turbine assembly and heat exchangers arranged therein. The water streaming through tubes along the casing wall is also the water which flows through the precooler and the intermediate cooler. The cooling of the hot gas line can be effected by a drawoff stream of the reactor cooling medium. The stream is drawn off from a point in the compressor of the turbine assembly. This drawoff stream is led through small annular chambers which are provided on the internal surface of the hot gas line.

SUMMARY OF THE INVENTION

The present invention provides an improvement in high pressure-high temperature gas turbine power plants having closed gas circuits wherein the cooling of the reactor cavity and hot working gas transport conduits are performed by cooling gas in the closed gas circuit.

An object of the invention is to equip the reactor pressure vessel of a gas turbine power plant of the type described above with a hot sealing liner, and to improve the thermal isolation for the reactor pressure vessel and modifying it without increasing plant costs.

An advantage of the present invention is that a high temperature gas turbine power plant is provided with a reactor chamber that is cooled efficiently and safely with high pressure gas from the closed gas circuit.

These and other objects and advantages of the invention are attained in a preferred embodiment of the invention by cooling the inside surface of a sealing liner in the reactor cavity, by means of a circuit gas of low temperature without additional external cooling, whereby the total volume of gas coming out of a high pressure compressor flows along the liner surface before its entry into recuperator units.

According to another embodiment of the invention, the circuit gas which is preferably helium, directly enters the liner which has neither an insulation nor a cooling system on its inside surface at temperatures from 100 to 140° C. Since these temperatures are produced in the plant itself, additional construction elements or members such as absorption devices are not required.

In a further advantageous embodiment of the invention, the circuit gas coming from a high pressure compressor is led through a gas conduit running coaxially to the hot gas conduit leaving the nuclear reactor. The gas from the high pressure compressor is cooling gas, and flows upwards in an annular chamber or free space between a thermal barrier and a sealing liner. The gas then leaves the free space through a second gas line flowing to the recuperators and running coaxially to a gas conduit which carries heated gas into the nuclear reactor cavity.

According to the invention, a gas turbine power plant is provided comprising a pressure vessel, a nuclear reactor as a heat source housed within a cavity in the pressure vessel, a gas turbine assembly housed within the pressure vessel having a gas turbine, means for compressing circuit gas and means for recuperative heat exchange, a thermal barrier within the cavity in the pressure vessel and defining an area surrounding the nuclear reactor, a sealing liner within the pressure vessel sealing the cavity, surrounding the thermal barrier and defining a free space between the thermal barrier and the sealing liner, and means for circulating cooling gas through the free space.

Furthermore, a method is disclosed for cooling a gas turbine power plant as described above comprising flowing the working gas of the power plant in a cool state through the free space located between the barrier and the sealing liner thereafter flowing the gas from the free space into the area defined by the thermal barrier and thereafter flowing the gas out of the area defined by the thermal barrier in its heated state into the gas turbine.

In the gas turbine power plant of the present invention, the cooling gas circulation means advantageously comprises a cooling gas inlet conduit joining a high pressure compressor and the free space, and a cooling gas outlet conduit joining the free space and the recuperative heat exchange means. The high pressure compressor releases the total volume of its cooling gas into the free space, and after circulation in the free space, the recuperative heat exchange means receives the total volume of the cooling gas.

In a preferred embodiment, the cooling gas inlet and outlet conduits are formed by coaxial conduit members, wherein the cooling gas circulates in the outer conduit about the inner conduit containing heated gas.

The means for recuperative heat exchange is advantageously formed by a combination of a recuperator unit, a precooler unit, and an intermediate cooler unit connected in series generally to the aforementioned outlet conduit. More than one group of recuperator, precooler and intermediate cooler units may be advantageously employed.

The means for compressing the circuit gas advantageously utilizes a high pressure compressor and a low pressure compressor. The compressors are individually connected in series to the recuperator, precooler and intermediate cooler units described above.

The recuperative heat exchange means as described is connected, in addition to the outlet conduit, also to the discharge conduit of the gas turbine. Accordingly, heated working gas leaving the gas turbine is able to flow through the recuperator units, precooler units and intermediate cooler units countercurrently to the flow of the alreadly cooled gas also flowing in the recuperator, precooler and intermedite cooler units from the outlet conduit. Accordingly, the coolest gas discharged from the high pressure compressor flows through the free space to cool the sealing liner and thereafter is heated in the recuperative heat exchange means by countercurrent flow with the heated gas discharged from the turbine, thereafter flowing into the area defined by the thermal barrier around the nuclear reactor to be further heated to the high temperatures necessary for operation of the gas turbines.

The compressor units, the gas turbines, and the recuperator units, precooler units, and intermediate cooler units are all contained in vertical recesses in the wall of the pressure vessel, and are connected by conduits running through the pressure vessel contained similarly in conduit recesses in the walls of the pressure vessel. The conduits joining the various components of the gas turbine power plant are advantageously coaxial conduits, wherein the gases of high temperatures flow within the inner conduits, and the gases of cooler temperature flow in the outer conduits. The area defined by the thermal barrier is connected to a heated gas inlet conduit and, a heated gas outlet conduit which advantageously are surrounded by the cooling gas flowing into and out of the free space formed by the thermal barrier and the sealing liner. Similarly, the gas turbine contains an inlet conduit and an outlet conduit with the inlet conduit communicating directly with the heated gas outlet from the area defined by the thermal barrier, and the turbine outlet conduit being in direct communication with the recuperator units. Advantageously, the recuperative heat exchange means and the gas compressor means may be arranged so that a recuperator unit is connected to a precooler unit and the precooler unit is in turn connected to a low pressure compressor unit, which is connected to an intermediate cooler, which in turn is connected to a high pressure compressor unit.

When employing a gas turbine power plant whose heat exchangers are arranged in vertical recesses in the wall of the reactor pressure vessel, the thermal isolation of the reactor pressure vessel can additionally be advantageously increased in a further embodiment by also feeding the recuperator units with a gas stream of low temperature, whereby the high pressure gas is led into a chamber, usually an annular chamber, between the casing of the recuperators and the sealing liners of the recesses. This arrangement makes possible good cooling of the reactor pressure vessel in the region of the recuperator units.

In other embodiments of the invention, the liner of the reactor cavity is equipped on the outside of the liner, i.e. in the area of the pressure vessel wall, with a conventional thermal insulation and cooling system. A further improved thermal insulation of the reactor pressure vessel can be achieved by means of this additional feature. In order to save on costs, it is not necessary that the entire liner of the reactor cavity be provided with an insulation and cooling system, but instead, that the thermal insulation system be attached only at those points having highest temperatures.

In a preferred embodiment, the cooling system of the liner may be connected to the main cooling system, i.e. it is in communication with the secondary side of the precoolers, existing in the primary or gas circuit. The cooling water circuit may be designed such that it flows at first through the secondary side of the precoolers, with cooling gas flowing through on the primary side before it enters the cooling system of the liner.

If the heat exchangers of the gas turbine power plant according to the invention are installed in vertical recesses in the wall of the reactor pressure vessel, as mentioned above, it is advantageous to feed the precoolers and intermediate coolers with water at the side of the casing. The water is fed into an annular chamber between the casing of the precoolers and intermediate coolers. It is therefore advantageous for the recesses in this instance, as well as in other embodiments, to contain sealing liners, such as steel liners. This design also leads to a decrease of the temperature of the wall of the reactor pressure vessel in the area of the recesses.

The cooling system for the liner of the reactor cavity can be, but need not be, connected to this cooling system.

The gas turbine power plant according to yet another embodiment of the invention can be equipped with a conventional afterheat removal system comprising several coolers and blowers. In each case, one cooler and one blower are installed above each other in a recess in the wall of the pressure vessel. During stand-by operation, the total afterheat removal system flows, preferably by a by-pass of cold high pressure gas, such that the cold gas stream is directed in each case from the bottom of the recesses between the sealing liner of the recesses and the casing of each cooler-blower unit upwards to the blowers after which if flows through the coolers from the top to the bottom.

BRIEF DESCRIPTION OF THE DRAWINGS

The operation of the gas turbine power plant according to the invention is schematically illustrated in the drawings. A single loop-plant with intermediate cooling and hot gas conduits is illustrated; the connection of the heat exchangers is also advantageously designed with two circuits but for the sake of clarity, only one loop is shown as follows.

DESCRIPTION OF PREFERRED EMBODIMENTS

Figure 1:
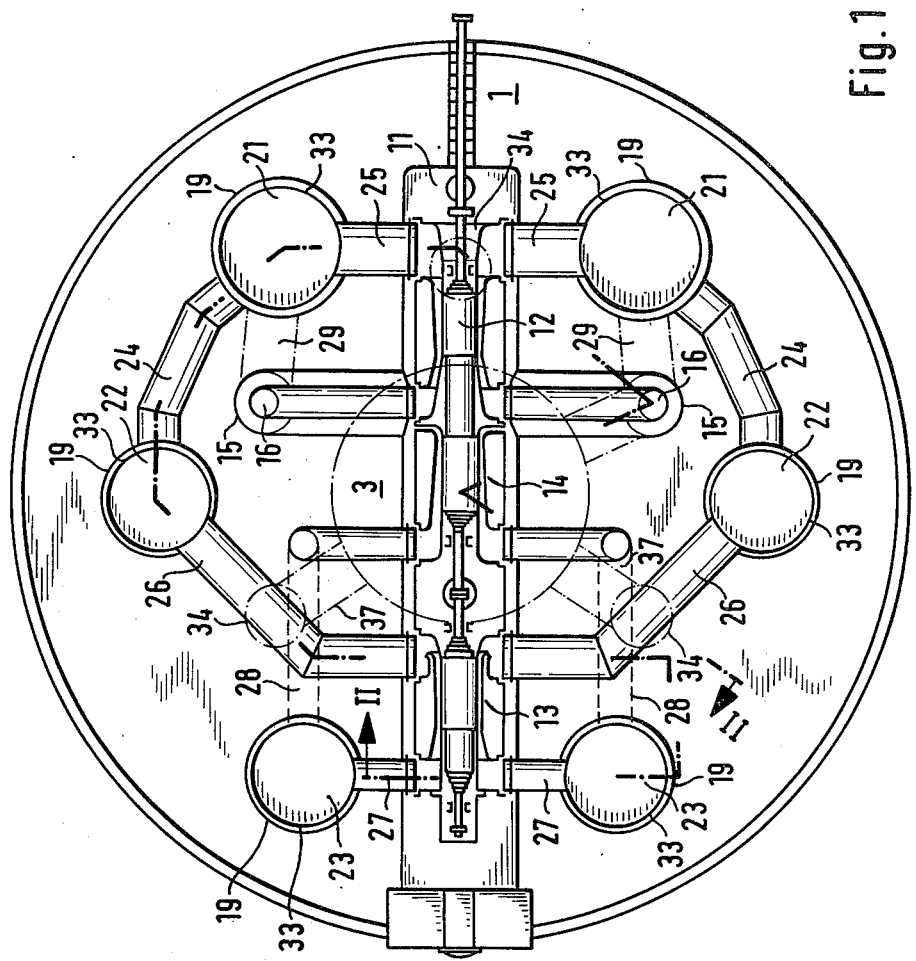
FIG. 1 shows a cross-sectional top view of the plant according to the invention.
Figure 2:
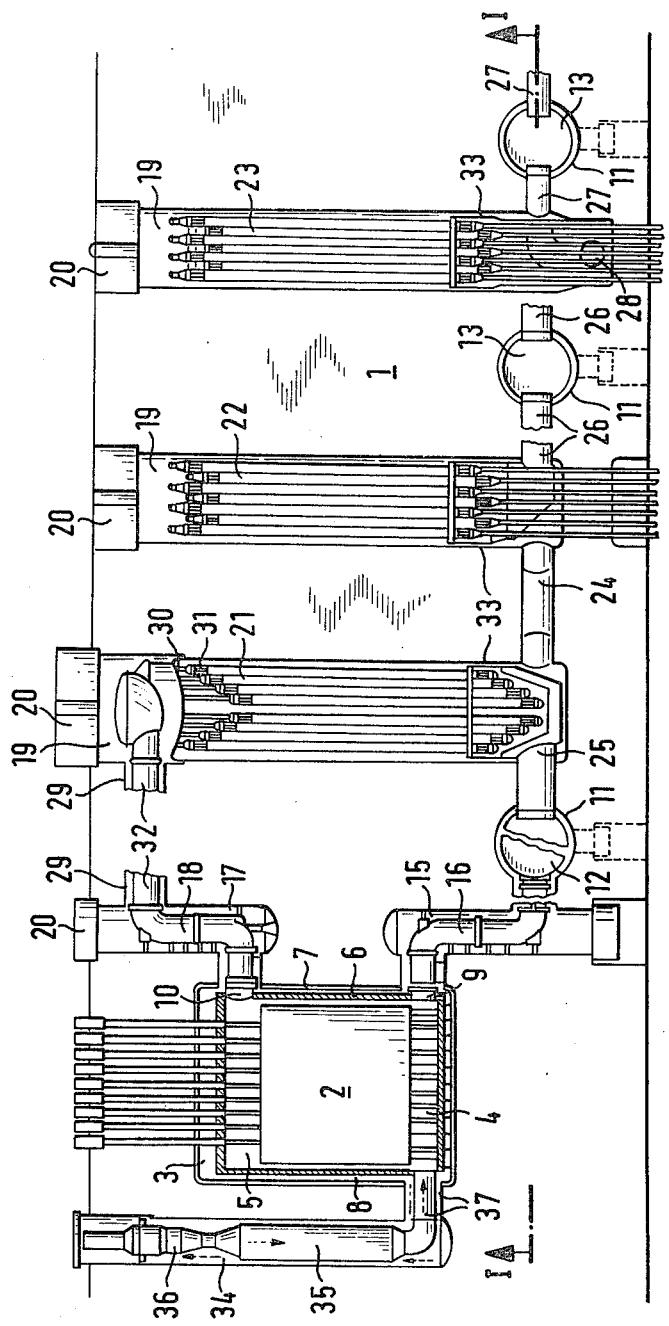
FIG. 2 shows a turbine power plant according to the invention.

FIGS. 1 and 2 illustrate a prestressed concrete vessel 1 cylindrically designed and arranged centrally inside a safety tank (not shown) made of steel reinforced concrete and having a cylindrical shape. Within the prestressed concrete vessel 1, there are arranged a high temperature reactor 2 and the other components of the primary or cooling gas circuit, consisting of a turbine, a high pressure and a low pressure compressor and heat exchangers. As will be further described below, the connection of the heat exchangers are designed with two loops or circuits, wherein a recuperator, a precooler and an intermediate cooler are contained in each circuit.

The high temperature reactor 2, installed in a cavity 3, is a graphite-modified, helium-cooled reactor, the fuel elements of which may be ball or block shaped. A hot gas collection chamber 4 is located below the bottom of the reactor core for collecting the heated gas released by the reactor core. A cold gas collection chamber 5 is provided above the reactor for collecting the gas flowing back from the main circuit before it is led back to the reactor core. The reactor core is surrounded by a cylindrically designed thermal barrier 6, and the cavity 3 has a sealing liner 7 which is not equipped on its side facing the reactor 2 with any thermal protection means, such as isolation or cooling system for insulating against the loss of heat. Between the thermal barrier 6 and the liner 7, there is arranged an annular chamber 8. The high temperature reactor 2 is connected to the remaining components of the main circuit by two outlet connecting ducts 9, attached to the high temperature reactor 2 at the bottom by the same inlet connecting ducts 10 attached on top. Vertically beneath the high temperature reactor 2, is arranged a horizontal duct 11 in the prestressed concrete vessel. A single shaft gas turbine 12, a low pressure compressor 13, and a high pressure compressor 14 are located within the vessel in separate housings. The compressors are situated with the gas turbine on a common shaft. A generator (not shown) which is arranged in the safety tank, is coupled to the gas turbine 12. The gas turbine and the compressors have two oppositely, horizontally arranged connecting ducts for each gas line.

Two vertical gas ducts 15 extend adjacent the gas turbine 12 upwards to the level of the bottom of the reactor core. A hot gas line 16 is installed in each of these gas ducts. Each hot gas line 16 is connected to one of the reactor outlet connecting ducts 9 and with one of the two turbine inlet connecting ducts. In the upper part of the prestressed concrete vessel 1, there are two more vertical gas ducts 17, in an arrangement similar to that of vertical gas ducts 15. In each case, one cold gas line 18 is connected to one of the two reactor inlet connecting ducts 10.

Six vertical pods 19 are arranged in a partial circle (see FIG. 1) around the reactor cavity 3, each pod being closed by explosion-proof lid 20. The pods 19 act to enclose the heat exchangers such that they are arranged, as shown in FIG. 1, in symmetrical arrangement with respect to the horizontal duct 11, two recuperators 21, two precoolers 22, and two intermediate coolers 23. All of the heat exchangers are installed at the same level as the reactor cavity 3. Both recuperators 21 are designed in box construction, and are operated countercurrently. The high pressure gas fed in from above is led through the interior of tubes 31 (see FIG. 2). The precoolers 22 and the intermediate coolers 23 are also designed in box construction and are operated countercurrently. The water, flowing within the tubes, enters the coolers from below. All of the heat exchangers are surrounded by a pressure casing 33, which separates the inlet and outlet streams.

At the same level as the horizontal duct 11, there are provided several horizontal gas lines in the prestressed concrete vessel for connecting the heat exchangers of one loop or circuit with each other, or with the gas turbine assembly, respectively. As depicted in FIG. 1, a gas line 24 runs between the recuperator, and the precooler of each loop, while the connection between both recuperators 21, and the turbine outlet connecting duct, is effected in each case by a gas line 25. The gas flows in each case through a gas line 26 from the precoolers 22 to the two inlet connecting ducts of the low pressure compressor, and between the low pressure compressor outlet and the two intermediate coolers 23, by virtue of a gas line 27 provided in each case. On a somewhat lower plane, there are located two gas lines 28 (dashed lines in FIG. 1) which connect the two intermediate coolers 23 with the inlets of the high pressure compressor.

From the high pressure compressor 14, to the two recuperators 21, the gas is led through vertical gas ducts 15 and 17, over a large part of its flow, whereby it flows along the outside of the hot gas lines 16 and the cold gas lines 18, which are arranged as coaxial gas lines. On its way from the gas duct 15 to the gas duct 17, the gas is led into the reactor cavity 3, coaxially to the reactor outlet connecting ducts 9, and enters the annular chamber 8 between the thermal barrier 6, and the liner 7. While it flows upwardly in this annular chamber, it cools the liner 7 which is equipped additionally with a means for insulating against the loss of heat in the prestressed concrete vessel 1 (see FIG. 3).

At the upper end of the vertical gas duct 17, there is provided, in each case, a horizontal connection line 29 of coaxial construction in communication with one of the two pods 19 in which the recuperators 21 are installed. Above the two recuperators, there is, in each case, arranged a gas distributor 30, serving also as a support through which the gas is distributed to the tubes 31. The upward feedback of the gas is effected in a central tube (not shown). The inner conduit 32 of the horizontal connecting line 29 is in each case connected to one of the two cold gas lines 18.

Figure 3:
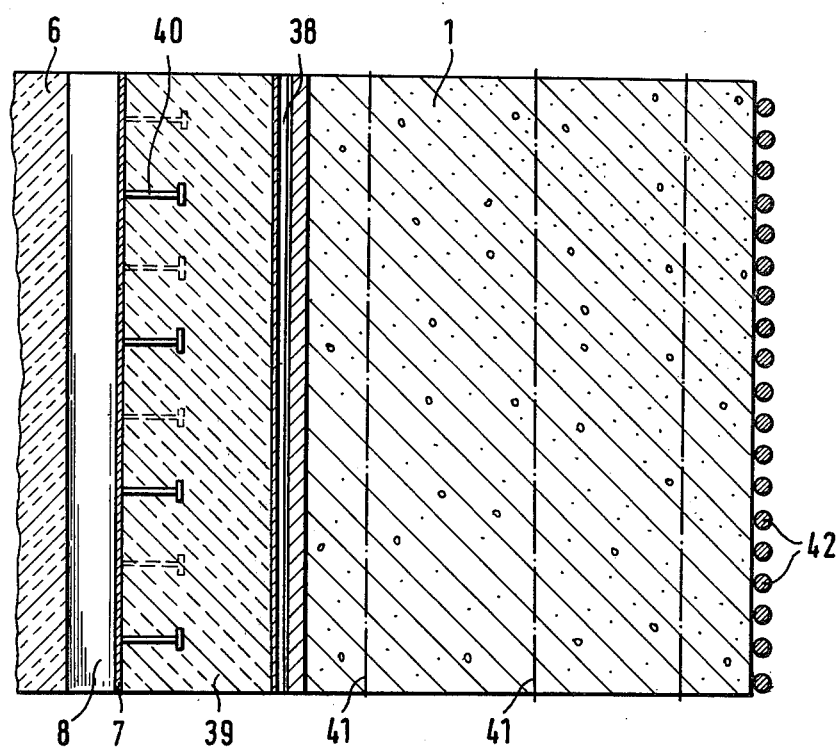
FIG. 3 shows a cutout of the sealing liner of the reactor cavity with thermal insulation and a cooling system.

All recesses in the prestressed concrete vessel 1 are coated with a sealing skin or liner made of steel. In the region of the coaxial gas lines in the gas ducts 15 and 17 and the horizontal connecting lines 29, only small temperature loads occur at the sealing liners, since the hot or warm gas streams, respectively, are surrounded in each case by colder gas streams. Besides the six vertical pods for the heat exchangers, there are provided in the prestressed concrete vessel 1, three other vertical pods 34 which are arranged along a circle having a radius smaller than that of the six vertical pods (dashed lines in FIG. 1). These act as an afterheat removal system, and, as shown in FIG. 3, are made up of the conventional cooler 35 and blower 36. Each cooler 35 and blower 36 is installed one upon the other in one of the pods 34. The cooler-blower units are each in communication with the high temperature reactor 2 by means of a coaxially arranged gas line 37.

During stand-by operation, a by pass of cold, high pressure gas flows through the cooler-blower units as shown by dotted arrows in FIG. 2. The cold gas stream is led upwardly from the bottom of each pod 34 into an annular chamber between the sealing liner of the pod and the cooler casing. It then enters the blower and flows again through the cooler 35 in a downward direction. During the operation of the afterheat removed system, the flow direction is reversed, whereby the entry of the gas into the reactor core is effected through special borings in the top of the thermal barrier 6 (not shown).

The main or turbine circuit will now be described with reference to either of the two identical heat exchanger loops connected in parallel. The pressure during operation ranges between about 72.9 and 22.9 bars, while the temperature ranges between an upper limit of about 850° C. and a lower limit of about 20° C. On the hot gas side, the gas flows at 850° C. and 70 bar directly from the hot gas collection chamber 4 through the coaxial hot gas lines 16 to the two inlet flanges of the gas turbine 12.

In the gas turbine 12, the working gas is released at a pressure of about 24.14 bars, and enters the recuperator 21 at a temperature of about 502.5° C. through the gas lines 25 at the side of the recuperator 21 and from the bottom. The gas is then streamed through the recuperator 21 from the bottom to the top. As a result, it is cooled down to about 147.7° C. by the cold gas flowing countercurrently at the high pressure side of the recuperator 21. Below the distributor 30, the gas stream is reversed 180°, and is led back between the casing of the recuperator 21 and the sealing liner of the pod 19 to the bottom of the pod. The gas reaches the precooler 22 through the gas line 24 and flows from the bottom to top between the sealing liner of the pod and the casing of the precooler 22. It enters the precooler after a reversal of the gas flow along the side of the casing from the top to the bottom. Here, the gas is cooled down to the lowest process temperature of 20° C., before it is led to the inlet of the low pressure compressor 13 through the gas line 26, after leaving the low pressure. The gas having a pressure of about 41.2 bars is led to the intermediate cooler 23 through the gas line 27, flowing through it in the same manner as the precooler 22 and flowing out of it at a temperature of about 20° C.

The gas reaches the inlet of the high pressure compressor 14 through the gas line 28 in which its pressure is increased to the maximum process pressure of about 72.9 bars. At the outlet of the high pressure compressor 14, the working gas behind the diffuser is deflected by 180° and flows around the entire gas turbine assembly. It then enters the vertical gas duct 15 through which it flows upwardly along the outside of hot gas line 16. It is then led upwardly at a temperature of 100°-140° C. through the annular chamber 8 into the reactor cavity 3, whereby it directly impinges the liner 7 at this temperature.

From the annular chamber 8, the cold, high pressure gas then flows through the vertical gas duct 17, and the horizontal connecting line 29 whereby it passes along the outside of the cold gas line 18 into the recuperators 21. In the recuperator 21, it is distributed among the single tubes 31 by the distributor 30. During the flowing through in the tubes 31 from the top to the bottom, the operation gas is heated by the turbine gas, flowing countercurrently along the side of the casing. In the central tube (not shown), it is then led upwardly and leaves the recuperator 21 through the inner conduit 32 of the coaxial horizontal connecting line 29. Through the cold gas line 18, and the reactor inlet connecting duct 10, the gas finally reaches the cold gas collection chamber 5 of the high temperature reactor 2.

FIG. 3 shows a section of the prestressed concrete vessel 1 with the liner 7, and its cooling system 38. This comprises a number of cooling lines, which are arranged in a thermal insulation layer 39 along the side of the concrete. The liner 7 is mounted along this layer by means of anchorings 40. In the prestressed concrete vessel 1, there are arranged axially running bracing cables, as well as annular bracing cable 42 around the circumference of the vessel. Furthermore, in FIG. 3, there can be seen the thermal barrier 6 in the cavity 3, and the annular chamber 8.

Figure 4:
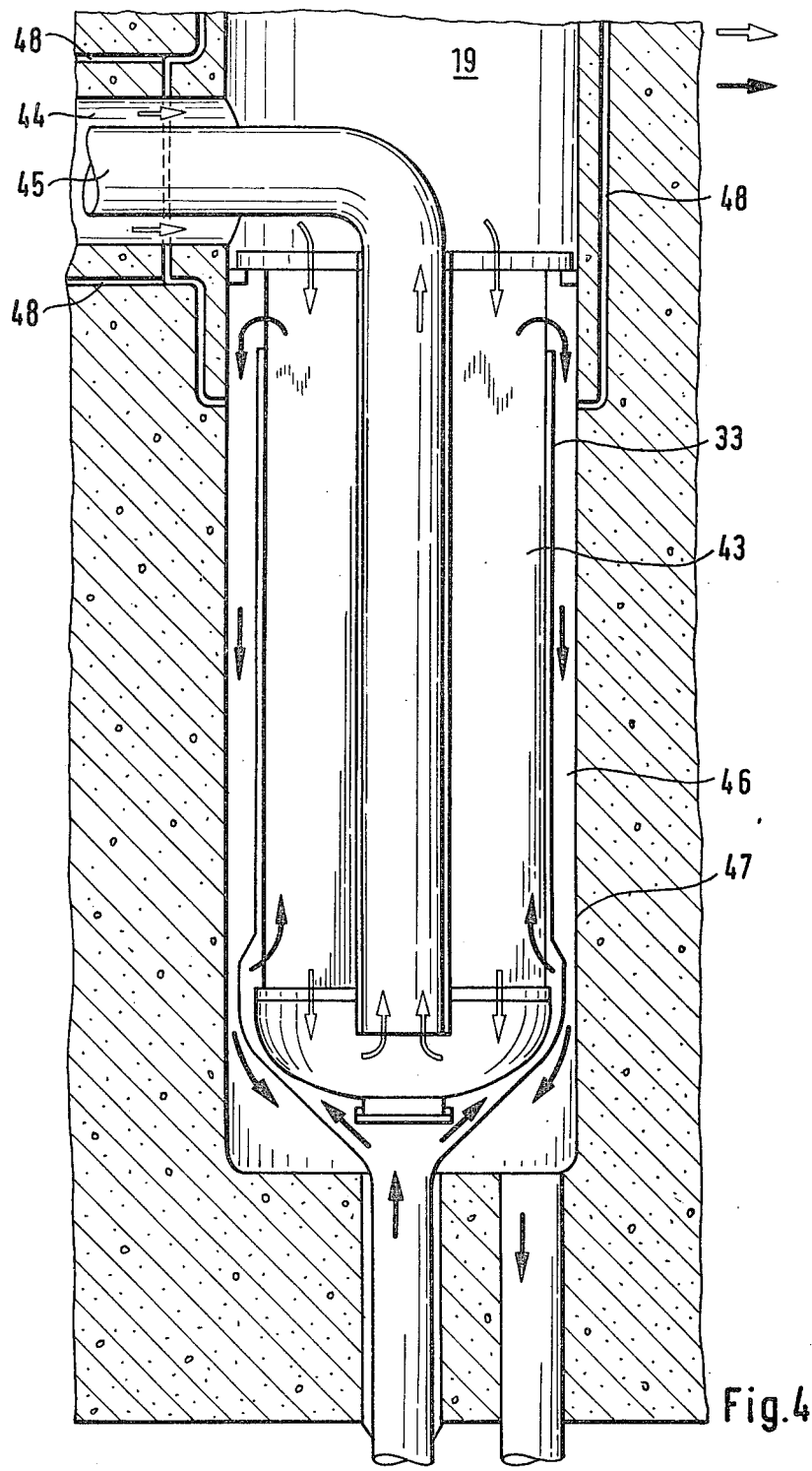
FIG. 4 shows the cooling system of a precooler of a nuclear power plant.

FIG. 4 illustrates a precooler 43 in another embodiment of the nuclear power plant with a cooling system which is connected to the cooling system 38 of the liner 7. This precooler is installed within a pod 19, situated in the prestressed concrete vessel 1. The feed of helium coming from the recuperator is effected from the top through the external conduit 44 of a coaxial gas line. The gas is led off again out of the precooler 43 through internal conduit 45 to a compressor, as indicated by the arrows. The cooling water enters the precooler 43 from the bottom, and flows in the manner indicated by the black arrows. After passing through the precooler 43, it is led along an annular chamber 46, which is bordered by the pressure casing 33 of the precooler and the sealing liners 47 of the pod 19 through the lines 48. The annular chamber 46 is in communication with the cooling system 38 of the liner 7 through conduit 48, thus permitting the flow of cooling water between the precooler and the liner cooling system.

The cooling system of a recuperator can also be designed in a similar fashion except, that instead of passing cooling water through the annular chamber between the pressure casing 33 of the recuperator and the sealing liner 47 of the pod 19, low temperature helium from the primary circuit (not shown) is flowed through the annular chamber.

The specification and drawings set forth preferred embodiments of the invention. It should be noted, however, that the invention is not limited to those specific embodiments and methods specifically disclosed, but extends instead to all embodiments substitute and equivalent constructions falling within the scope of the invention, as defined by the claims.

What is claimed is:

1. A gas turbine power plant comprising:
   a pressure vessel;
   a nuclear reactor as a heat source housed within a cavity in said pressure vessel;
   a gas turbine assembly housed within said pressure vessel having a gas turbine, means for compressing circuit gas and means for recuperative heat exchange;
   a thermal barrier within said cavity in said pressure vessel and defining an area surrounding said nuclear reactor;
   a sealing liner within said pressure vessel sealing said cavity, surrounding said thermal barrier and defining a free space between said thermal barrier and the sealing liner; and
   means for circulating cooking gas through said free space comprising a cooling gas inlet conduit joining said high pressure compressor and said free space, and a cooling gas outlet conduit joining said free space and said recuperative heat exchange means, said high pressure compressor releasing the total volume of cooling gas to said free space and said recuperative heat exchange means receiving the total volume of cooling gas after circulation through said free space.

2. The gas turbine power plant as in claim 1, wherein each of said cooling gas inlet and outlet conduits comprise the outer conduit of a coaxial conduit member for circulation of cooling gas about an inner conduit member.

3. The gas turbine power plant as in claim 2, wherein said means for recuperative heat exchange comprises a recuperator unit, a precooler unit and an intermediate cooler unit connected in series to said outlet conduit.

4. The gas turbine power plant as in claim 3, wherein said means for compressing circuit gas comprises a high pressure compressor and a low pressure compressor, each individually connected in series with said recuperator, precooler and intermediate cooler units.

5. The gas turbine power plant as in claim 4, wherein said recuperative heat exchange means is also connected to said gas turbine.

6. The gas turbine power plant as in claim 5, wherein said units of the recuperative heat exchange means, said compressor and said gas turbine are contained in vertical recesses in the wall of said pressure vessel, and are connected by conduits contained in conduit recesses in the walls of said pressure vessel.

7. The gas turbine power plant as in claim 6, wherein the interior of said thermal barrier is in communication with heated circulating gas of higher temperature than said cooling gas.

8. The gas turbine power plant as in claim 7, wherein the area defined by the thermal barrier is connected to a heated-gas inlet conduit and heated-gas outlet conduit, and said heated circulating gas further absorbs heat energy from said nuclear reactor within said thermal barrier.

9. The gas turbine power plant as in claim 8, wherein each of said heated-gas inlet and outlet conduits comprise the inner conduit of said coaxial conduit member whereby each heated-gas inlet and outlet conduit is surrounded by one of said cooling gas conduits.

10. The gas turbine power plant as in claim 9, wherein said heated-gas inlet conduit is connected to said recuperative heat exchange means.

11. The gas turbine power plant as in claim 9, wherein said heated-gas outlet conduit is connected to said gas turbine.

12. The gas turbine power plant as in claim 4, wherein said gas turbine comprises a turbine inlet conduit and a turbine outlet conduit, and said turbine outlet conduit is connected to said recuperator unit for removing heat from gases leaving the outlet conduit of the turbine.

13. The gas turbine power plant as in claim 12, wherein said recuperator unit is connected to said precooler unit having a precooler inlet and a precooler outlet and, wherein said precooler outlet is connected to the inlet of said low pressure compressor unit, and wherein said low pressure compressor unit has an outlet which is connected to the inlet of said intermediate cooler unit having an inlet and outlet, said outlet of said intermediate cooler unit being connected to the inlet of said high pressure compressor unit having an inlet and an outlet, and said outlet of said high pressure compressor unit is connected to said cooling gas inlet conduit of said free space.

14. The gas turbine power plant as in claim 13, further comprising a thermal insulation layer between said sealing liner and the cavity forming wall of the pressure vessel; a passageway for cooling fluid disposed in said insulation layer; and means for circulating cooling fluid through said cooling passageway.

15. The gas turbine power plant as in claim 14, further comprising means for circulating cooling fluid through said precooler, intermediate cooler, and recuperator units.

16. The gas turbine power plant as in claim 15, wherein said cooling fluid in said cooling passageway, precooler and intermediate cooler units is water and said cooling fluid in said recuperator unit is said cooling gas.

17. The gas turbine power plant as in claim 15, wherein the means for circulating cooling fluid comprises a cooling fluid inlet for each of said precoolers, intermediate cooler and recuperator units, a chamber surrounding each of said precooler, intermediate cooler and recuperator units, a cooling fluid outlet for each of said chambers and a cooling fluid circulation source; whereby cooling fluid enters said cooling fluid inlets, flows through said units into said chambers, through said outlets and back to said cooling fluid circulation source.

18. The gas turbine power plant as in claim 4, further comprising an afterheat removal system comprising at least one blower and corresponding cooler unit located within recesses provided in the walls of said reactor pressure vessel and communicates with said cavity in said pressure vessel.

19. A method for cooling the gas turbine power plant of claim 1 comprising:
flowing the working gas of the power plant in a cool state through said free space located between said barrier and said sealing liner thereafter flowing said gas from said free space into the area defined by said thermal barrier and thereafter flowing said gas out of the area defined by said thermal barrier in its heated state into said gas turbine.

20. The method as defined by claim 19, wherein said gas flows from said free space into said recuperator heat exchange means prior to flowing within the area defined by said thermal barrier.

21. The method as defined by claim 20, wherein said gas flows from said gas turbine into recuperative heat exchange means countercurrently to said gas entering said recuperative heat exchange means from said free space.

22. The method as defined by claim 21, wherein said gas flows in a closed gas circuit comprising said free space, said recuperative heat exchange means, said compressor means, said area defined by said thermal barrier and said gas turbine.

* * * * *